United States Patent [19]

Crook, Jr.

[11] 4,076,430
[45] Feb. 28, 1978

[54] PIN AND LOCKING COLLAR CONNECTOR FOR LOAD BEARING PARTS

[76] Inventor: Edward J. Crook, Jr., 6348 S. 70th East Ave., Tulsa, Okla. 74133

[21] Appl. No.: 692,999

[22] Filed: Jun. 4, 1976

[51] Int. Cl.² .......................... F16B 21/00; F16B 2/14
[52] U.S. Cl. .................................... 403/154; 403/161; 403/243; 403/371
[58] Field of Search ............... 403/119, 150, 154, 155, 403/157, 161, 243, 371, 372

[56] References Cited

U.S. PATENT DOCUMENTS

| 325,221 | 8/1885 | Wright | 403/154 |
| 1,142,177 | 6/1915 | Kennedy | 403/154 |
| 3,198,563 | 8/1965 | Steidl | 403/154 |
| 3,358,569 | 12/1967 | Averette | 403/157 |

*Primary Examiner*—Reinaldo P. Machado
*Attorney, Agent, or Firm*—Head, Johnson & Chafin

[57] ABSTRACT

A cylindrical metal pin used to connect and permit the relative rotation of two mechanical parts, is held and prevented from relative longitudinal motion by means of a flanged, slotted, locking collar and bushing.

9 Claims, 15 Drawing Figures

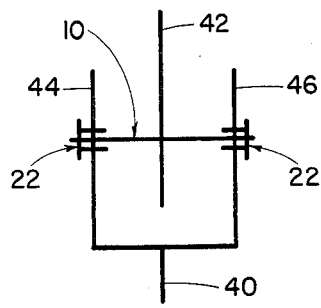
Fig. 6
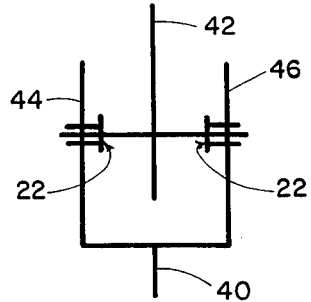
Fig. 7
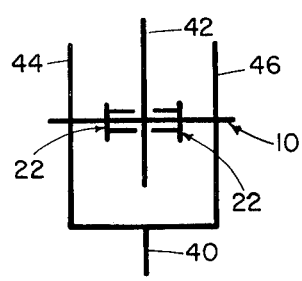
Fig. 8
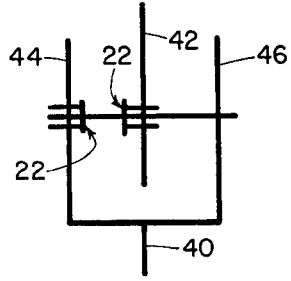
Fig. 9
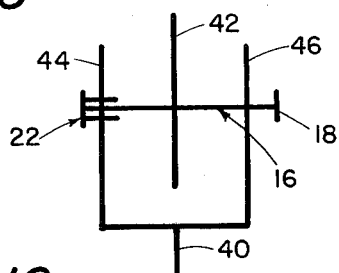
Fig. 10
Fig. 11
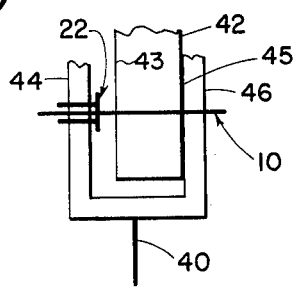
Fig. 12
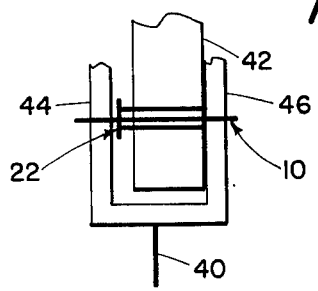
Fig. 13
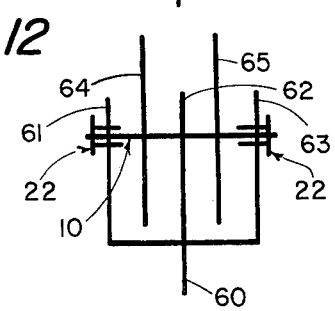
Fig. 14
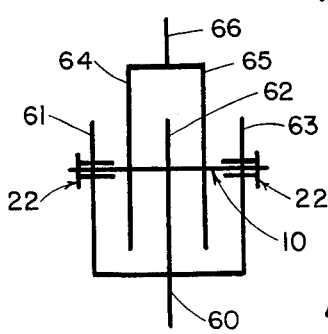
Fig. 15

PIN AND LOCKING COLLAR CONNECTOR FOR LOAD BEARING PARTS

BACKGROUND OF THE INVENTION

The invention lies in the field of locking means for pins applied to join and permit rotation of two elements with respect to each other.

More particularly, it concerns the method of locking a pin within a series of openings between at least two members, so that the members can rotate with respect to each other, while the pin is prevented from moving longitudinally out of the openings.

In the prior art, in the construction of machinery, it is often necessary to connect two machine elements or arms, by using a pin about which they can rotate. There have been devised many methods of securing the pin from drifting from containment within each of the elements. Such restraining devices that have been used are, for example, cotter pins, nuts, roll pins, spring pins, safety wire, ball detent plungers, locking rings, snap rings, etc. All of these devices either project beyond the outer surfaces of the machine members in their most simple form, or require the machine member to be complex in shape to guard the pin securing device. This adds additional cost and requires special tools for the assembly and disassembly of the machine elements.

Many of the above devices are applicable only in non-load bearing situations. Further, a roll pin which is driven through the two connecting machine elements by the use of a hammer and grabs one of the machine elements by the expansive outer force caused by the compression of the roll pin, has a weakness in that the pin is hollow in shape and split longitudinally. For this reason, it has less bending strength than a solid pin of equal outer diameter.

A grooved pin is slotted during manufacturing so as to develop sharp projections along the edges of the slot and is then heat treated into a hardened condition, and can be driven into the machine elements by the use of a common hammer. The sharp projections cut into one of the machine elements thereby securing the pin in position. However, when the pins are removed and reapplied several times, in the same machine element, the cutting effect of the sharp projections enlarged the internal diameter of the machine element opening, and make the later holding of the pin impossible.

SUMMARY OF THE INVENTION

It is therefore a primary object of this invention to provide a locking collar means of holding a solid pin within the openings provided in at least two co-acting members and which collar means further functions as the load bearing surface for the two members.

These and other objects and advantages of this invention and a better understanding of the principles and details of the invention will be evident from the following description taken in conjunction with the appended drawings in which said means comprises a flanged, slotted, locking collar, which has a lesser inner diameter than the diameter of the pin, and which can be positioned over the end of the pin by use of a simple hammer. In the use of the flanged locking collar, the opening in one or both of the parts which are held together by the pin, the inner diameter of the hole is slightly larger than the diameter of the collar, so that the pin and collar can rotate together within the opening.

BRIEF DESCRIPTION OF THE DRAWINGS

These and other objects and advantages of this invention and a better understanding of the principles and details of the invention will be evident from the following description taken in conjunction with the appended drawings, in which;

FIGS. 6, 7, 8, 9, 10, 11, 12, 13, 14, and 15 illustrate a plurality of different combinations of pins, collars and mechanical parts to which the pin and collar of this invention can be applied.

DESCRIPTION OF THE PREFERRED EMBODIMENTS

Figure 1:
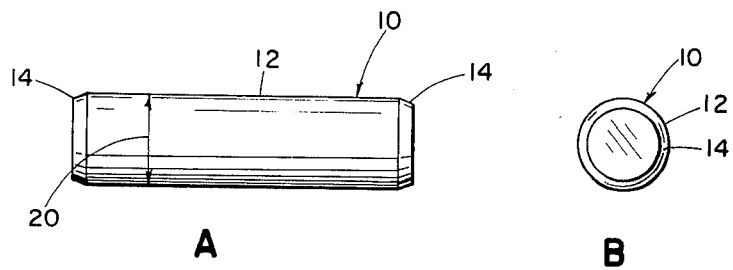
FIG. 1 represents side and end views of a typical pin used with the flanged collar of this invention.

Referring now to the drawings and in particular to FIG. 1 there is shown a side and end view of a typical cylindrical metal pin adapted for use in conjunction with the flanged collar of this invention in joining mechanical parts in rotative relations.

The pin 10 comprises a cylinder of metal of the appropriate metallurgical properties and of such diameter and length to satisfy the strength requirements and physical dimensions of the joint between the first and second parts. The ends of the pin are chamfered so as more easily to be inserted into the bushing, by positioning the pin coaxially with the bushing and driving the pin into the bushing with a hammer. Since the design of the pin is based on well known principals of machine design and metallurgy, no further description of the pin is required.

Figure 2:
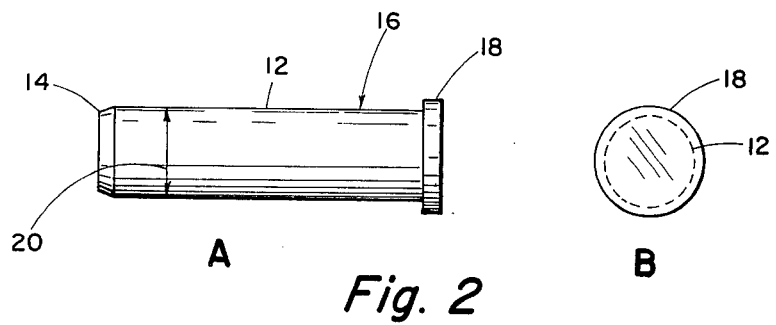
FIG. 2 represents the side and end views of a special pin, that is similar in all respects to the pin of FIG. 1, except that it has a flange on one end.

In FIG. 2 is shown a modification of the pin of FIG. 1 labeled generally by the numeral 16. This has a cylindrical portion 12 which is identical to that of FIG. 1 but at one end has a flange 18 of selected diameter and thickness, which is adapted to press against the side face of one part through which the pin is inserted, to limit motion in that entry direction. The diameter and thickness of the flange 18 is a matter of choice and should be large enough in diameter to prevent the longitudinal movement of the pin, and thin enough to provide a minimum obstruction on the side of the machine part.

Figure 3:
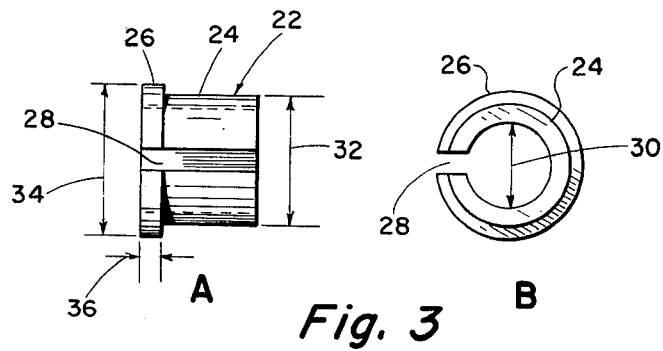
FIG. 3 illustrates the side and end view of one embodiment of the slotted, flanged locking collar of this invention.

FIG. 3 illustrates the side and end views of one embodiment of the flanged locking collar 22 of this invention. The device comprises a tubular or bushing portion 24 and a flange 26 on one end, and having a longitudinal slot 28 cut through the flange and bushing. The inner diameter 30 of the bushing and collar is somewhat less than the outer diameter 20 of the pins 10 and 16. The purpose of the smaller diameter is that when the pin is driven into the central opening through the collar, it will elastically expand the collar, and because of the metallurgical property of the bushing, there will be a compressive force inwardly from the collar onto the pin. By properly selecting the internal diameter, or the difference in diameter between the inner diameter of the bushing and the outer diameter of the pin, that compressive force can be made any selected value. So long as it is sufficiently large, it can prevent the separation of the collar from the pin, except where the pin is driven from the collar by means of a simple tool such as a hammer.

Because the diameter 34 of the flange 26 is somewhat larger than the diameter 32 of the bushing portion 24, there will be a greater stress in the outer fibers of the flange, than in the outer fibers of the bushing. It is desirable therefore to limit the extent by which the diameter 34 of the flange exceeds the diameter 32 of the bushing. The thickness 36 of the flange can be made as small as desired so long as the flange is thick enough to prevent the shaft from breaking off the flange in the normal course of the use of the locking collar.

There are many applications where two mechanical parts are pivoted, one with respect to the other, by means of a pin. This can be a simple joint like a strap and a yoke, with the strap inserted between the ears of the yoke. It can be a yoke on the end of a hook which is coupled to the last link of a chain by insertion of a pin through the two openings in the ears of the yoke, passing inside of the link.

There can be other combinations in which there is one yoke with more than one strap, or there can be a type of structure in which there are three ears attached to one arm with two separate straps positioned between the pairs of ears, and so on. Since there are a great number of possible combinations, such designs will be described in some detail, illustrating the use of mechanical devices, and the use of a hook and chain, for example. Further than that, the various combinations will be illustrated by means of simplified diagrams which will indicate many combinations of parts, shafts, and locking collars. These will be shown in FIGS. 6 to 15 and will serve to provide illustration of the specific combinations which will be described in the claims appended to this specification.

It will be clear also that where a simple shaft 10 of FIG. 1 and two flanged collars 22 of FIG. 3 are used in a yoke, for example, having two ears, the flange of the collar can be outside of the outer surfaces of the ears where their thickness becomes an obstruction beyond the limits of the mechanical parts, or, as is well known in the art, the openings in the yoke can be counterbored on the outside to a diameter greater than that of the flange on the locking collars, so that the flanges can be hidden within the outer surfaces of the ears of the yoke.

It does not appear necessary to illustrate all of the possible combinations wherein the flanges are on the outside of the mechanical parts and all of the same combinations where the flanges are inserted into counterbored openings. Since the man versed in the art of these devices will know how to modify a design in which the flanges are on the outer surface, so as to incorporate the flanges in a counterbored opening. Consequently, one series of illustrations will be provided within most of which, the flanges will be on the outside of the mechanical parts.

Figure 4:
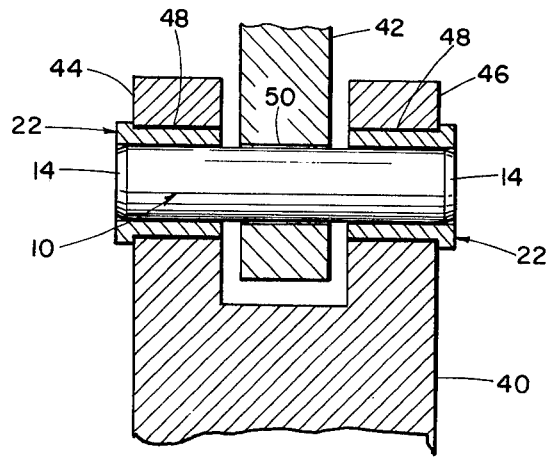
FIG. 4 represents the use of the flanged collar and pin of FIGS. 1 and 2 in joining in rotative relation, a first part having a U-shaped end, and a second part inserted between the ears of the U-shaped portion.

Referring now to FIG. 4, there is a first part 40 which is in the form of a yoke having two ears 44 and 46 in the form of a U-shape. There is an opening drilled or otherwise prepared through the ears 44 and 46, of diameter 48. There is a second part 42 coacting with the first part 40 which comprises a simple bar having an opening 50 near one end. The diameter of the opening 50 is slightly larger than that of the pin 10 so that the bar 42 can rotate about the pin. If desired, it is possible of course to insert bearings into the opening 50 as is well known in the art, so that more precise operation and frictionless rotation of the part 42 is possible.

In assembling the device of FIG. 4, a collar 22 is inserted into the ear 44 from the outside, and a corresponding flanged locking collar 22 is inserted into the opening 48 in the ear 46, from the outside. The second part 42 is inserted between the ears 44 and 46 and the pin 10 is positioned against the flange of one of the collars and is hammered into that collar, through that collar into the opening 50 in the second part 42, and then through the second collar 22 in the opposite ear, until the ends of the pin are centrally positioned within the collars 22 in the two ears 44 and 46.

As mentioned previously, by choice of the thickness of the wall of the collar, that is, the difference in diameter between the outer diameter of the collar 32 and the inner diameter 30, and the metallurgical properties of the collar, and the differential diameter between the inner diameter 30 of the collar and the outer diameter 20 of the pin, the compressive force between the collar and the pin can be adjusted to any selected value. Therefore, by the use of a common hammer, it is possible to insert the pin into the collar and to have it remain there during operation of the assembly, without possibility of the pin migrating out of the openings.

FIG. 4 may be taken as an example of the use of the locking collars in holding a pin in working relation with a first part 40 and a second part 42 which are held in mutual rotational condition by the pin.

Figure 5:
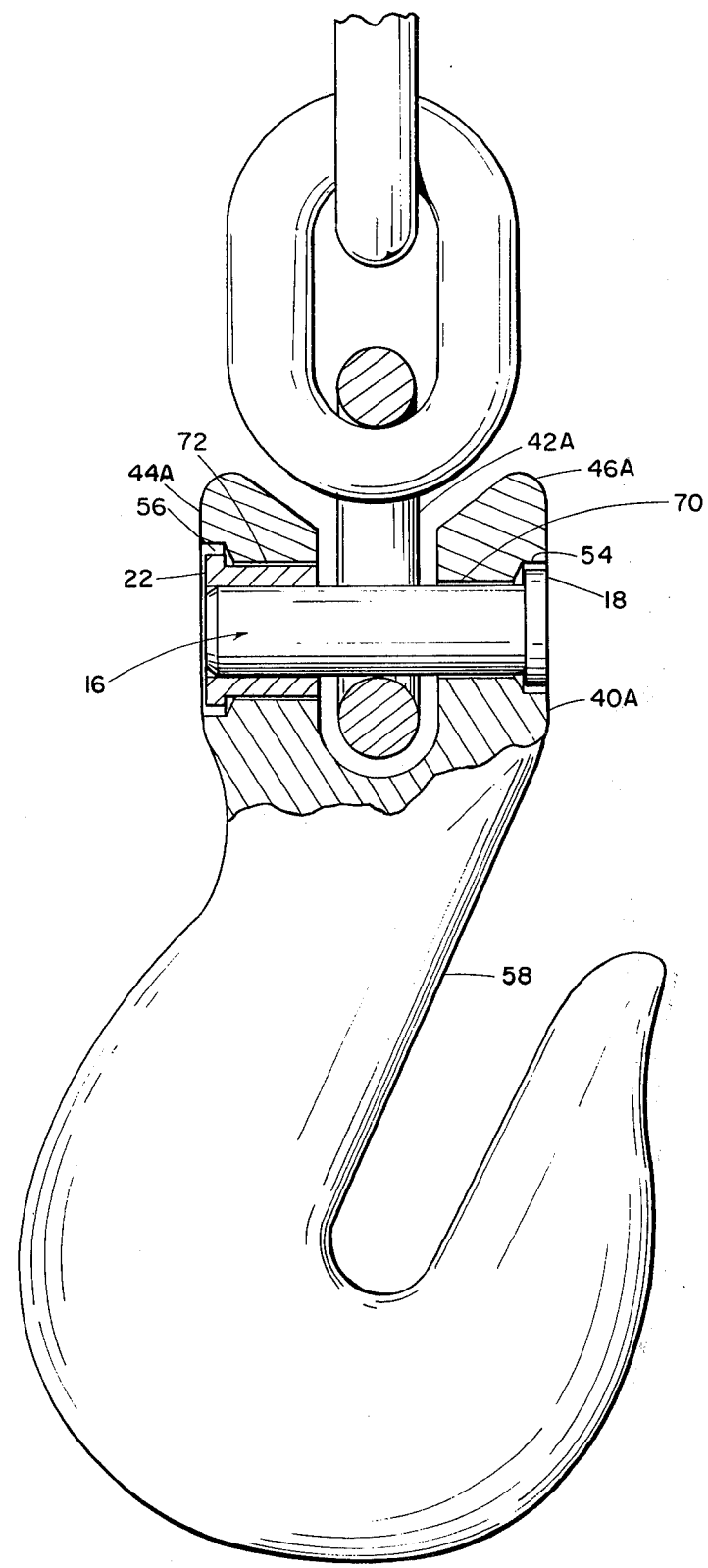
FIG. 5 illustrates the use of the pin of FIG. 2 and the bushing of FIG. 3 in a means for joining a hook to a chain.

Referring now to FIG. 5, there is shown another example of the utilization of the flanged locking collar of this device in securing a pin to hold a chain link 42A in locking relation to a hook 58. The end of the hook has two ears 44A and 46A in the form of a yoke having two parallel ears. There is an opening through the two ears the opening in one ear 70 is of a diameter slightly larger than the pin diameter. The opening 72 in the other ear is coaxial with the opening 70 but of a larger diameter sufficient to clear the outer diameter of the collar 22 in its expanded position. In this example, the outer surfaces of the ears 44A and 46A are counterbored to conceal the flange 18 of the pin 16, and the flange 56 of the collar 22.

To assemble the device illustrated in FIG. 5, a collar 22 would be inserted into the opening in ear 44A. The hook would be turned on its side so that the surface of the ear 44A would be horizontal and resting on a metal block of some sort. The opening through the ears would be vertical. A chain link 42A would be inserted into the space between the ears and the pin 16 inserted thrugh the opening 70 through the link and into the collar 22. At least the chamfered end of the pin would be inserted into the collar. A hammer would then be used to pound the pin down into the collar 22 into the position shown. When it is desired to disassemble the hook from the chain the reverse operation is performed. That is, the ear 46A is set onto a block in which there is an opening large enough to pass the flange 18 of the pin 16. Using a rod of a diameter less than that of the pin 16, a hammer is used to drive the pin 16 out of the collar 22, after which it can be removed from the link 42A and the ear 46A.

FIG. 4 illustrates the use of a simple uniform diameter pin and two collars to restrain the pin. FIG. 4 illustrates also the use of the collars where the flange is on the outside surface of the ears 44 and 46.

FIG. 5 illustrates the case where one flange 18 is on pin 16, and the other flange 56 is on the collar 22. FIG. 5 illustrates also the capability of counterboring the openings through the ears, so as to permit the flanges of the pin and/or the collars to be inside of the counterbore, so that the surfaces of the ears are flush. It is seen also that where only a single collar is used, the diameter of the openings through the two ears are different, since one supports the pin directly and the other ear supports the pin through the load transfer of the collar.

The features of a number of combinations are illustrated by FIG. 4 and FIG. 5. That is, the linear pin, the flanged pin, the use of a flanged pin with a flange collar, and the use of two flanged collars, and so on. In FIGS. 6 to 15, various combinations of these will be illustrated, without giving the mechanical details, which will be substantially identical to the details shown in FIGS. 4 and 5.

FIG. 6 illustrates in line drawing the interaction of a first part 40 which is in the form of a U-shaped yoke having ears 44 and 46, with a second part 42 in the form of a bar or strap, which is inserted between the ears 44 and 46 of the part 40. The parts are shown in line drawing, but it will be understood that they will have width according to the drawings of FIGS. 4 and 5. In FIG. 6, the shaft 10 is held in position within the ears 44 and 46 by means of two flanged bushings 22 with the flanges on the outside. In other words, FIG. 6 is identical with FIG. 4, except for being in line drawing form.

FIG. 7 illustrates an assembly similar to FIG. 6 except that the flanged collars 22, which are inserted into the openings in the ears 44 and 46, are inserted from the inside of the ears. Therefore, they reduce the spacing between the inside surfaces of the ears 44 and 46 and presumably the spacing between the two collars 22 will be equal to the width of the part 42, plus a desired clearance. The design of FIG. 7 is as simple to assemble as is the design of FIG. 6 and provides flush surfaces on the outsides of the part 40.

In FIG. 8, the same two parts 40 and 42 are shown, except in this case the two collars 22 which grasp the shaft 10 are installed in the opening in the part 42. This again provides a flush surface on the outside of the ears 44 and 46. As in the case of FIG. 7, the spacing between the flanges of the collars 22, and the thickness of the part 42 will fit within the walls of the ears with suitable clearance, as is shown in FIG. 4.

FIG. 9 is a combination of FIG. 8 and FIG. 7, in a sense that one bushing is inserted into one ear from the inside as in FIG. 7, and a second bushing is inserted into the opening in the second part 42. It can be inserted as shown on the side which faces the other bushing in the ear 44, or it can be inserted on the opposite side where it contacts the inner surface of the ear 46 again providing a clearance on each side of the part 42 with respect to the inner surfaces of the ears 44 and 46.

FIG. 10 illustrates again with the two parts 40 and 42 the type of shaft and locking arrangement of FIG. 5. That is, the use of a flanged pin 16 having flange 18 on the outside of one ear 46, with a flanged collar 22 inserted into the opening into the other ear 44. This corresponds to the situation in FIG. 5 except that the flanges are on the outside and not in a counterbore.

FIG. 11 illustrates another possibility in which a flanged shaft 16 is used inserted through the outer wall of the ear 46 and a flanged collar 22 is used in the same ear 46 but inserted through the inside wall. Thus, the shaft 16 goes through simple holes in the other ear 44 and the part 42 but is guided in two directions by the flange 18 of the pin and the flange of the collar 22.

Illustrated in FIG. 12 is another variation in which the same parts 40 and 42 are utilized except that the spacing between the inner faces of the ears 44 and 46 is such as to permit one flange of a locking collar 22 inserted into one ear 44 by the inner surface, and to provide sufficient clearance between the flange 22 and the inner surface of the other ear 46 for the width of the second part 42 between faces 43 and 45.

FIG. 13 is similar to FIG. 12 except that the flanged collar 22 is inserted into the second part 42 instead of into the ear 44. Again, the dimensions must be such as to maintain the proper clearance, but the shaft is guided solely by a single collar. In general, in the situation shown in FIG. 13 the width of the second part 42 will be substantially equal to the length of the locking collar, so that a full bearing support will be provided for the shaft through the locking collar to the part 42.

FIGS. 14 and 15 illustrate the case where the first part 16 has three spaced-apart ears 61, 62 and 63, with two second parts 64 and 65 inserted between pairs of ears. In FIG. 14, the two parts 64 and 65 are separate whereas in FIG. 15 they form the two ears of a yoke construction 66. In both FIGS. 14 and 15, the simple shaft 10 with locking collars 22 on the outside surfaces of the outside ears of the first part 60 are shown. However, it is clear that the various combinations shown in FIGS. 6 to 13 could be used in any of the corresponding positions in the assemblies of FIGS. 14 and 15 and it would be obvious to adapt the details of FIGS. 6 to 13 into the structure of FIGS. 14 and 15.

In the design of the flanged collar the thickness of the sleeve portion 24 (FIG. 3), that is, the (dimension 32 - dimension 30)/2 should be as small as possible to keep the hole in the part into which the sleeve is positioned, as small as possible.

The diameter 34 of the flange 26 should be kept as small as possible while providing sufficient shoulder to provide adequate lateral interference to resist pin drift.

The material of which the collar is made can be any suitable material having the required resiliency, such as chrome moly steel, or 41-30 carbon steel having high tensile strength and good load bearing capability.

Empirical equations have been developed relating critical dimensions of the flanged collar.

Let D represent the outer diameter 20 of the pin.

Let A represent the outer diameter 34 of the flange.

Let B represent the inner diameter 30 of the collar.

Let g represent the shoulder of the flange, that is, dimension 34 - dimension 32.

Let f represent the expansion of the collar when the pin is driven into the collar.

Let j represent the flange radical thickness.
Then:

$$A^2 = 1.69 \, D^{1.8}$$
$$f = 0.031 \, D^{1.25}$$
$$g^2 = 0.008 \, D^{1.1} - 0.0008$$

and, of course, $$B = D - f$$
$$j = (A-B)/2$$

While the invention has been described with a certain degree of particularity, it is manifest that many changes may be made in the details of construction and the arrangement of components without departing from the spirit and scope of this disclosure. It is understood that the invention is not to be limited to the embodiments set forth herein for purposes of exemplification, but is to be limited only by the scope of the attached claim or claims, including the full range of equivalency to which each element thereof is entitled.

In particular, for each combination of flanges on pin and/or collar, whether specifically claimed or not it will be understood that the claims cover the cases where the flanges are outside of the outer surfaces of the parts, or the surfaces of the parts are counterbored so that the flanges can be placed within the surface contour of the parts.

It will be further understood that for the portion of the pin which lies within a part, the diameter of the opening in that part will be selectively larger than the diameter of the pin, and where a collar is positioned over the pin, the opening in the part will be selectively larger than the outer diameter of the collar.

Also, it will be understood that while the pins have been illustrated as being of uniform diameter, and the openings of different diameters, depending on whether the pin has a collar in the position of a part, the pin may be made of varying diameter, with the openings in the parts of uniform diameter, and so on. It will be clear that if the pin is made with two different diameters, the position at which the diameters differ can act as a collar as in FIG. 10, so that only a single locking collar will be needed.

What is claimed:

1. In a load bearing connection for a first mechanical part positioned between the ears of a second mechanical yoke part having axial openings through said parts comprising:

a locking collar having a resilient metal bushing of selected metallurgical properties having a flange at one end, of length at least the length of an opening through one of said mechanical parts and positioned within said opening;

a longitudinal slot through said bushing and flange, a uniform diameter pin extending through said openings and said bushing, said pin of length substantially no greater than the outside width across the assembled parts and collar, the internal diameter of said collar less than the diameter of said pin such that said collar and pin are firmly clamped for rotation together relative to said parts which openings are larger than the outside diameter of said collar.

2. The apparatus as in claim 1 in which said pin has a flange on one end, and said flanged locking collar is positioned within an opening on the other end of said pin.

3. The apparatus as in claim 1 in which said axial opening in said first part is counterbored to a diameter larger than the diameter of said flange, whereby said flange is concealed within said counterbore.

4. The apparatus as in claim 1 including a flanged locking collar on each end of said pin, with the flanges on the outside of said ears.

5. The apparatus as in claim 1 wherein at least one flanged locking collar on one end of said pin with said at least one flange on the inside of one ear.

6. The apparatus as in claim 1 including at least two flanged locking collars, one on each end of said pin, with both flanges on the inside of said ears.

7. The apparatus as in claim 1 including a third mechanical yoke part having an opening for said connector, said third yoke positioned between said ears of said second part, at least one locking collar on said pin within said second part, and a second locking collar on said pin within the opening of said third part.

8. The apparatus as in claim 1 in which said first mechanical part is a link of a chain, or the like.

9. The apparatus as in claim 1 in which said first part comprises a hook or the like.

* * * * *

UNITED STATES PATENT OFFICE
CERTIFICATE OF CORRECTION

Patent No. 4,076,430  Dated February 28, 1978

Inventor(s) Edward J. Crook, Jr.

It is certified that error appears in the above-identified patent and that said Letters Patent are hereby corrected as shown below:

On the cover page, Item [73] should read:

--- American Hoist & Derrick Company, Tulsa, Okla. ---

Signed and Sealed this

Fourth Day of July 1978

[SEAL]

Attest:

RUTH C. MASON
*Attesting Officer*

DONALD W. BANNER
*Commissioner of Patents and Trademarks*